United States Patent [19]

Swinton

[11] Patent Number: 5,072,979
[45] Date of Patent: Dec. 17, 1991

[54] PROTECTIVE PANEL FOR AUTOMOTIVE VEHICLE

[76] Inventor: Randolph M. Swinton, 2174 S. Racine Way, Y201, Aurora, Colo. 80014

[21] Appl. No.: 532,801

[22] Filed: Oct. 15, 1990

[51] Int. Cl.⁵ .............................................. B60R 19/42
[52] U.S. Cl. ..................................... 293/128; 280/770
[58] Field of Search ........................... 293/1, 126, 128; 280/770; 296/136

[56] References Cited

U.S. PATENT DOCUMENTS

| | | | |
|---|---|---|---|
| 4,014,583 | 3/1977 | Forbes | 293/128 |
| 4,531,560 | 7/1985 | Balanky | 296/136 X |
| 4,707,008 | 11/1987 | Falco | 293/128 |
| 4,708,380 | 11/1987 | Cruz | 293/128 |
| 4,726,614 | 2/1988 | Myers et al. | 293/128 |
| 4,750,767 | 6/1988 | Barnett | 293/128 |
| 4,796,935 | 1/1989 | Maraia | 293/128 |
| 4,810,013 | 3/1989 | Spears | 293/128 |
| 4,810,015 | 3/1989 | McNeil | 293/128 |

*Primary Examiner*—Margaret A. Focarino
*Assistant Examiner*—Andrew C. Pike
*Attorney, Agent, or Firm*—Steve Gratton

[57] ABSTRACT

A protective panel is provided for removable attachment to the side of an automobile or the like to protect the automobile against scratches and dents. The protective panel includes a main panel section and one or more side panel sections hingedly attached to the main panel section. Magnets are provided for attaching the panel sections to the side of the automobile. Additionally, anti-theft tabs attached to the main panel section are formed to hook around the edge of the automobile door and wedge into the door jam to prevent theft of the protective panel. The protective panel may fold into a compact assembly for storage.

16 Claims, 1 Drawing Sheet

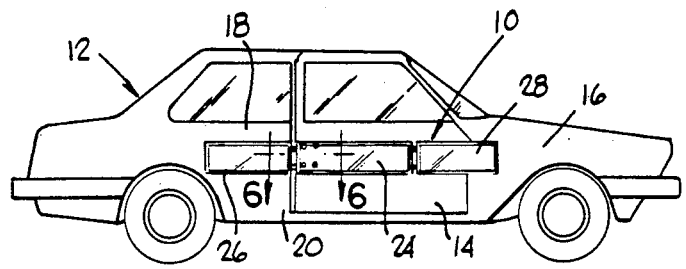
FIG. 1
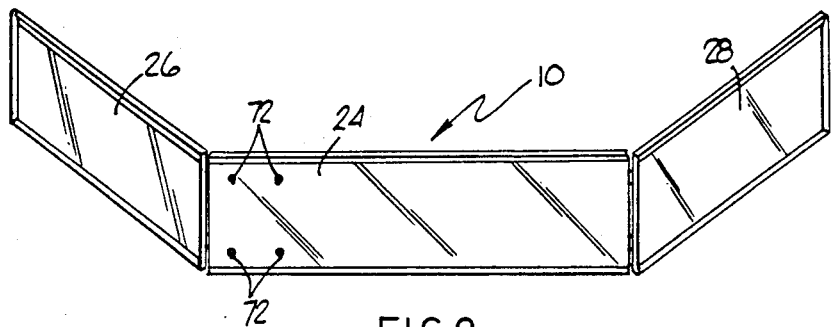
FIG. 2
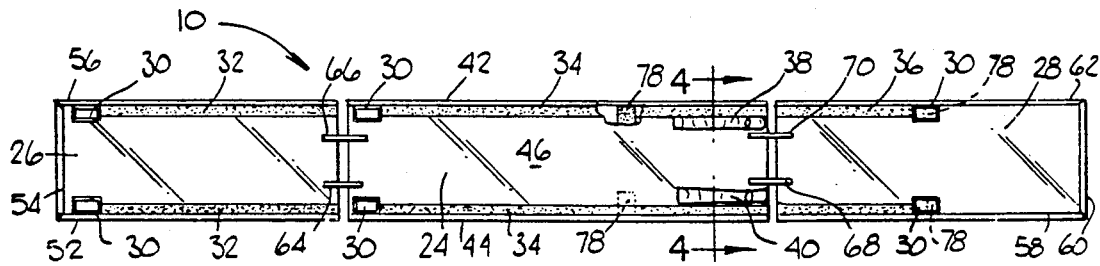
FIG. 3
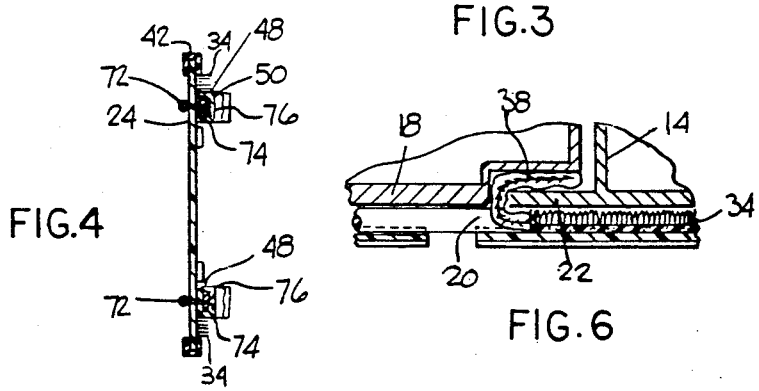
FIG. 4
FIG. 6
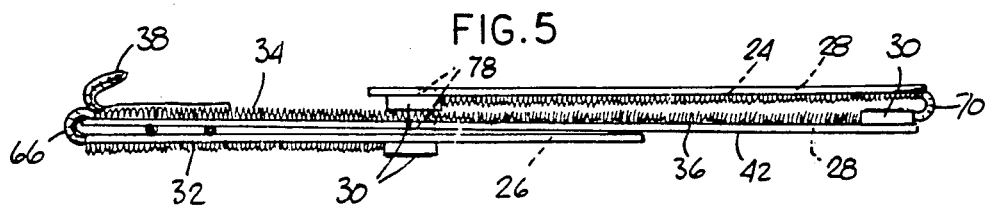
FIG. 5

PROTECTIVE PANEL FOR AUTOMOTIVE VEHICLE

FIELD OF THE INVENTION

This invention relates to automotive parts and more particularly to a novel protective panel for protecting the doors and exterior side panels of an automobile from scratches and dents.

BACKGROUND OF THE INVENTION

It is well known that automobiles are susceptible to dents and scratches from adjacent cars and other vehicles such as shopping carts and bicycles in parking lots. This is especially known by people with newer or more well maintained automobiles who are often reluctant to park in the spaces adjacent to the other cars (especially the "junkers"). Older "bombs" with large heavy doors are often able to exert considerable damage when opened onto a closely parked adjacent vehicle. Additionally, newer model cars are typically formed with lighter gauge metals and dent more easily that the vehicles heretofore manufactured.

In the past, it has been common practice to manufacture cars with side protectors in the form of protective chrome or side strips to help prevent damage from adjacent parked vehicle. These side protectors are often inadequate for protection from other vehicles which may be substantially higher. Furthermore, some vehicles because of aesthetic or design reasons may not even have any side protectors.

Various removable after market automotive protectors have therefore been proposed as an aid in protecting a parked vehicle. These protectors are typically placed on the side of the automobile while it is parked and then removed and stored for driving.

U.S. Pat. No. 4,810,015 to McNeil and U.S. Pat. No. 4,810,013 to Spears are typical of such removable protectors. These patents disclose vehicle door guards which utilize elastic loops or hooks to secure the door guard to the side of a vehicle.

U.S. Pat. No. 4,707,008 to Falco and U.S. Pat. No. 4,531,560 to Balanky disclose protective covers for vehicles in which magnets or suction cups are utilized to attach the protective cover to the automobile.

U.S. Pat. No. 4,014,583 to Forbes and U.S. Pat. No. 4,750,767 to Barnett disclose automotive side protectors which are attached or suspended from the top of a door or window of the automobile.

U.S. Pat. No. 4,726,614 to Myers et al. and U.S. Pat. No. 4,708,380 to Cruz disclose door protectors for automobiles which utilize security tabs or retainer straps which fit inside the door or door jamb of the vehicle to prevent theft of the protective cover.

In general these protective covers have not received wide spread commercial acceptance. Some are difficult to mount and do not adequately protect the vehicle. Others may be cumbersome and can not be conveniently stored. Still others may be unattractive when mounted to the side of a vehicle.

The present invention is directed to a removable protective cover for automobiles which overcomes these prior art limitations. The protective cover of the invention easily and securely attaches to the side of a vehicle and can be compactly folded for storage. Additionally, it is attractively constructed of materials that are protective and durable but will not scratch the finish of a car. The protective cover is also provided with anti-theft tabs which prevent its unauthorized removal from a vehicle.

SUMMARY OF THE INVENTION

In accordance with the present invention, the protective panel for removable attachment to the side of a vehicle is provided. The protective panel, generally stated, comprises at least two panel sections hingedly attached to one another, parallel spaced padding strips attached to an inner surface of the panel sections, a pair of magnets attached to each panel section for removably attaching the protective panel to a vehicle, and anti-theft tabs attached to an inner surface of a panel section and formed to be placed in a door jamb of the vehicle to prevent unauthorized removal of the protective panel from the vehicle.

The protective panel of the invention is designed to be easily attached or removed from the side of a vehicle yet folds into a compact assembly for easy storage. Additionally the panel sections are formed of a hard plastic material such as plexiglass which provides protection for the vehicle and also an aesthetically pleasing appearance. In addition, the protective panel is provided with padding strips and edge protectors to prevent scratching or marring of the vehicle's finish.

BRIEF DESCRIPTION OF THE DRAWINGS

FIG. 1 is a side elevation view of an automobile showing a protective panel constructed in accordance with the invention attached to a side of the automobile;

FIG. 2 is a perspective view of a protective panel constructed in accordance with the invention;

FIG. 3 is a side elevation view of a protective panel constructed in accordance with the invention;

FIG. 4 is a section taken along section line 4—4 of FIG. 3.

FIG. 5 is a plan view showing a protective panel constructed in accordance with the invention and shown in a folded position for storage; and FIG. 6 is a cross-sectional view taken along section line 6—6 of FIG. 1.

DETAILED DESCRIPTION OF THE PREFERRED EMBODIMENT

Referring now to FIG. 1, a protective panel 10 constructed in accordance with the invention is shown removably attached to a vehicle which is shown as a two door automobile 12. The automobile 12 includes a side door 14 mounted between a front fender panel 16 and a rear side fender 18. The door 14 is hingedly attached to the front side fender 16 of the automobile 12. A door jamb 20 is formed on the rear side fender 18 of the automobile for receiving the edge 22 (FIG. 6) of the door 14.

The protective panel 10 of the invention is designed to be removably attached to the side door 14 and side fenders 16, 18 of the automobile 12 to protect the automobile 12 from dents and scratches from adjacent parked vehicles and the like. Although the protective panel 10 of the invention is shown as removably attached to a two door automobile 12, it is to be understood that the protective panel 10 may also be utilized with other vehicles such as trucks or four door automobiles and that different sized protective panels 10 may be formed for different sized automobiles.

With reference to FIGS. 2 and 3 the protective panel 10 of the invention generally stated comprises a main panel section 24, side panel sections 26, 28 hingedly connected to the main panel section 24, attachment means in the form of pairs of magnets 30 attached to each of the panel sections 24, 26, 28 for attaching the protective panel 10 to the automobile 12, padding means in the form of padding strips 32, 34, 36 attached to each of the panel sections 24, 26, 28, and anti-theft means in the form of anti-theft tabs 38, 40 attached to the main panel section 24 for placement in the door jamb 20 of the automobile to prevent theft of the protective panel.

The main panel section 24 is generally rectangular in shape and generally flat in cross section, and may be formed of a hard durable material such as colored plexiglass. The top and bottom edges of the main panel section 24 are fitted with generally u-shaped rubber or plastic edge guards 42, 44 to prevent scratching or marring of the automobile finish. The edge guards 42, 44 may be glued or otherwise attached to the edges of the main panel section 24.

Two magnets 30 are attached to an inner (automobile facing) surface 46 of the main panel section 24 for attaching the protective panel 10 to the automobile 12. The magnets 30 may be glued or otherwise permanently attached to the main panel section 24. The magnets 30 may be encased in plastic or coated with a relatively soft material such as silicone sealant to prevent marring or scratching of the automobile finish.

The main panel section 24 is also provided with padding means in the forms of parallel spaced padding strips 34 which may be glued or otherwise permanently attached to the main panel section 24. The padding means function to provide a mounting surface for mounting the main panel section 24 to the automobile 12 without scratching or marring the surface or finish of the automobile. The padding strips 34 may be formed of any suitable non-scratching material such as rubber, gasket material, or foamed plastic. One such suitable material for the padding strips 34 is automotive matting or carpeting having a resilient or rubber-like backing 48 (FIG. 4) on which a synthetic fibers or carpet-like material 50 is embedded on an exterior surface.

As shown in FIG. 3 the padding strips 34 extend from approximately end to end of the main panel section 24 and are situated along the edge guards 42, 44 and parallel to one another.

As shown in FIG. 3, each of the side panel sections 26, 28 are also provided with magnets 30 and parallel spaced padding strips 32 or 36 which are permanently attached with adhesive or other fasteners. Additionally, three edge guards 52, 54, 56 are provided on the bottom, outside, and top side edges of side panel section 26 and three edge guards 58, 60, 62 are provided on the bottom, outside, and, top side edges of side panel section 28.

Additionally, as shown in FIG. 3, side panel section 26 is hingedly attached to two parallel spaced hinge straps 64, 66 to the main panel section 24. Likewise, side panel section 28 is hingedly attached to two parallel spaced hinge straps 68, 70 to the main panel section 24. As shown in FIG. 5 and as will be hereinafter more fully explained, this hinged construction allows the assembly to be compactly folded for storage or transport.

With reference to FIG. 3, the anti-theft tabs 38, 40 are also permanently attached to the main panel section 24 on the inner surface 46 (automobile facing) of the main panel section 24. The anti-theft tabs 38, 40 are attached by metal fasteners such as pop rivets 72 (FIG. 4) placed through the tabs 38, 40 and main panel section 24. As shown in FIGS. 5 and 6 the anti-theft tabs 38, 40 have a generally u-shaped end configuration which is formed to hook around the edge 22 of the door 14 of the automobile. The anti-theft tabs 38, 40 can thus be wedged by the door 14 within the door jamb 20 to prevent theft of the protective panel 10. As shown in FIG. 4, the anti-theft tabs 38, 40 may be formed of metal strap 74 formed with a generally hook or u-shaped end and surrounded by a boot 76 of a softer non-scratching material such as plastic, vinyl, or the like.

In use of the protective panel 10 of the invention and as shown in FIG. 1, the protective panel 10 is placed on the door 14 and on the front 16 and rear 18 side fenders of the automobile 12. The anti-theft tabs 38, 40 on the main panel section 24 are aligned with the door jamb 20 and hooked around the edge 22 of the automobile door 14. Closing the car door 14 wedges the anti-theft tabs 38, 40 as shown in FIG. 6 against the door edge 22 and door jamb 20.

The magnets 30 on the panel sections 24, 26, 28 along with the anti-theft tabs 38, 40 hold the protective panel 10 in place against the side of the car. The padding strips 32, 34, 36 and edge guards 42, 44, 52, 54, 56, 58, 60, 62 on the panel sections 24, 26, 28 insure that no sharp edges scratch or mar the exterior surface of the automobile 12. The protective panel 10 may be attached to either the right or left side of the automobile.

For storage and as shown in FIG. 5, the side panel sections 26, 28 are folded over the main panel section 24. Velcro hook and loop patches 78 attached to the outer surface of the main panel section 24 and to the outer surface of the side panel section 26 respectively maintain the side panel section 26 closed against the main panel section 24. Likewise, placement and alignment of the magnets 30 on the side panel sections 26 and 28 maintain the side panels sections 26, 28 closed against one another.

Although the protective panel has been described in a preferred embodiment having three panel sections, a protective panel having two panel sections constructed in accordance with the invention may also be utilized. Additionally, panel sections of varying dimensions may be constructed for automobiles of varying sizes or door configurations. The protective panel is preferably constructed with a width i.e. 5-9 inches which provides a relatively wide band of protection. The inventor has found that a length of approximately 30 inches for the main panel section and approximately 20 inches for the side panel section gives as overall length that is suitable for most mid sized automobiles. For smaller or compact cars at least one of the side panels sections can be made with a length of approximately 10 inches. For protective panels formed of two panel sections panel lengths of approximately 40 inches (80 inches overall length) are generally suitable for mid or full sized automobiles.

It is apparent from; the foregoing that a simple yet unobvious protective device for automobiles has been provided. While only one presently preferred embodiment has been described in detail, as will be apparent to those familiar with the art, certain changes and modifications can be made without departing from the scope of the invention as defined by the following claims.

What is claimed is:

1. A protective panel for automobiles comprising:
   a first generally flat generally rectangularly shaped panel section formed of a hard plastic material;

a second generally flat generally rectangularly shaped panel section formed of a hard plastic material and hingedly attached to said first panel section;

anti-theft tabs attached to an inner surface of said first panel section and formed to be hooked around a door edge of the automobile and wedged in a door jamb to prevent removal of the protective panel from the automobile;

attachment means in the form of magnets attached to inner surfaces of said first and second panel sections respectively for removably attaching the protective panel to a side of the automobile; and padding strips attached to the inner surface of said first and second panel sections to prevent scratching of the automobiles by the protective panel.

2. The protective panel as disclosed in claim 1 and further comprising:

a third generally flat generally rectangularly shaped panel section formed of a hard plastic material and hingedly attached to said first panel section.

3. The protective panel as disclosed in claim 2 and further comprising:

edge protectors attached to edges of said first, second, and third panel sections.

4. The protective panel as disclosed in claim 3 and wherein:

said padding strips are formed of automotive matting material formed of a resilient or rubber-like backing with synthetic fibers embedded on an exterior surface.

5. The protective panel as disclosed in claim 4 and wherein:

said anti-theft tabs are formed of metal straps fastened to said first panel section and covered with a boot.

6. The protective panel as disclosed in claim 5 and wherein:

said boot is formed of a vinyl material.

7. A protective panel for automobiles comprising:

a first generally flat generally rectangularly shaped panel section formed of a plastic material and having edge protectors attached to top and bottom edges;

a second generally flat generally rectangularly shaped panel section formed of a hard plastic material hingedly attached to said first panel section and having edge protectors attached to top, bottom, and outside side edges;

anti-theft tabs attached to an inner surface of said first panel section and formed with an end portion adapted to be placed round an edge of an automobile door and wedged in a door jamb to prevent unauthorized removal of the protective panel from the automobile;

at least one pair of magnets attached to an inner automobile facing surface of said first and second panel sections for removably attaching the protective panel to a side of the automobile; and parallel spaced padding strips attached to the inner automobile facing surface of said first and second panel sections along the top and bottom edges of said first and second panel sections.

8. The protective panel as claimed in claim 7 and further comprising:

a third generally flat rectangularly shaped panel section formed of a hard plastic material hingedly attached to said first panel section.

9. The protective panel as claimed in claim 8 and wherein:

said second and third panel sections are hingedly attached to said first panel section with flexible straps of material.

10. The protective panel as claimed in claim 9 and wherein:

said padding strips are formed of automotive matting material cut into strips.

11. The protective panel as claimed in claim 10 and in: said anti-theft tabs are covered with a boot.

12. The protective panel as defined in claim 11 and wherein:

said anti-theft tabs are riveted to said first panel section.

13. A protective panel for automobiles comprising:

a generally flat generally rectangularly shaped main panel section formed of a colored plexiglass material and having edge protectors attached to top and bottom edges and having a pair of magnets attached thereto for holding the protective panel on a side of the automobile;

a first generally flat generally rectangularly shaped side panel section hingedly attached to one or more flexible straps to said main panel section and having edge protectors attached to top, bottom, and outside side edges and having a pair of magnets attached thereto for holding the protective panel on the side of the automobile;

anti-theft tabs attached to an inner surface of said main panel section and adapted to be placed around an edge of an automobile door and wedged into a door jamb to prevent theft of the protective panel; and parallel spaced padding strips attached to said main panel section and side panel section along an upper edge and a lower edge of said main panel section and said side panel section to prevent scratching of an automobile finish by the protective panel.

14. The protective panel as defined in claim 13 and further comprising:

a second generally flat generally rectangularly side panel section hingedly with flexible straps to said main panel section.

15. The protective panel as defined in claim 14 and wherein:

said main panel section and said first and second side panel sections have a width in a range of three to five inches.

16. The protective panel as defined in claim 15 and wherein:

said main panel section has a length of approximately 30 inches and said side panel sections each have a length of approximately 20 inches.

* * * * *